Oct. 2, 1962

R. S. ZEBARTH 3,056,161

AUTOMATIC NECK CUTTER

Filed Aug. 10, 1960

INVENTOR.
Ralph S. Zebarth
BY
Hovey, Schmidt, Johnson & Hovey
ATTORNEYS.

Oct. 2, 1962
R. S. ZEBARTH
3,056,161
AUTOMATIC NECK CUTTER
Filed Aug. 10, 1960
2 Sheets-Sheet 2
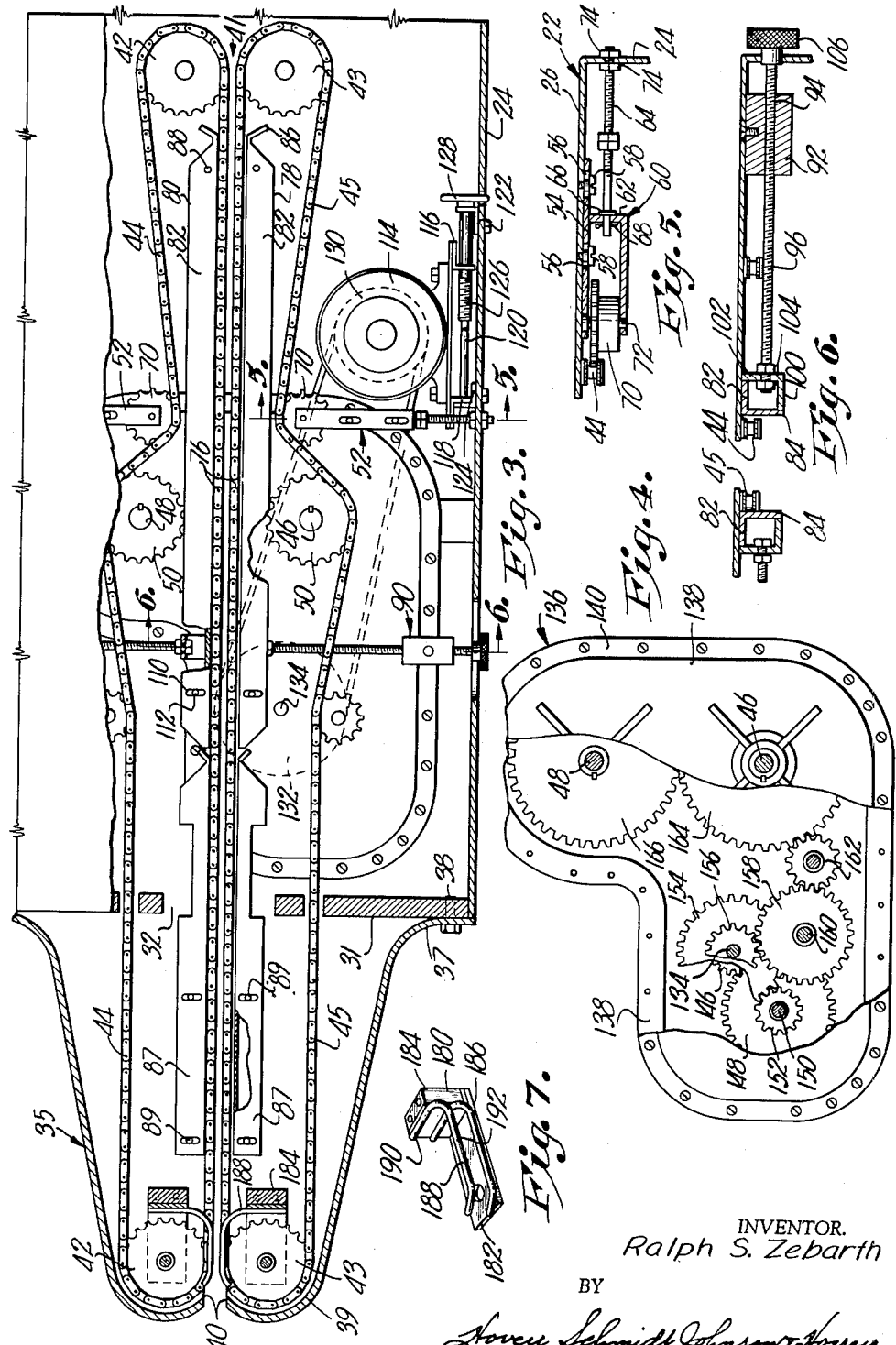
INVENTOR.
Ralph S. Zebarth
BY
Hovey, Schmidt, Johnson & Hovey
ATTORNEYS.

3,056,161
AUTOMATIC NECK CUTTER
Ralph S. Zebarth, Kansas City, Mo., assignor to Gordon Johnson Company, Kansas City, Mo., a corporation of Missouri
Filed Aug. 10, 1960, Ser. No. 48,615
6 Claims. (Cl. 17—11)

This invention relates to poultry processing equipment utilizing cutter means for automatically severing the neck of a bird from the body thereof and conveying the severed neck to a disposal point remote from the cutter means.

The instant application is an improvement of the disclosure in my copending application, Serial No. 766,859, filed October 13, 1958, now Patent No. 2,993,228, entitled "Poultry Neck Severing Machine," in which was set forth structure for automatically severing the neck of a bird from the body thereof substantially at the zone of merger of the bird's neck with the spine thereof. This structure included a support, cutter means on said support proximal to one end of the latter, and a pair of endless chains carried by the support and movable relative thereto for conveying therebetween the neck to be severed to the cutter means.

Structure also was included in my copending application which was directed to the fracturing of the bird's vertebrae proximal to said zone of merger prior to engaging the cutter means so that the latter would sever only the skin holding the fractured neck to the body of the bird to thereby prevent the cutter means from becoming dull by excessive use. The severed neck was adapted to be released from the holding action of the chains almost immediately after becoming separated from the body, and the neck was then directed toward a chute for disposal.

Although such a construction has been proven entirely satisfactory, it has been found that the same can be improved by extending the point at which the severed neck is released from the chains a greater distance from the cutter means and thereby, the end of the support, so that there is no possibility of the severed neck being released by the chains proximal to the end of the support and dropping between the chains and the support to thereby jam the system and reduce the efficiency thereof. Furthermore, guide means are necessary to smoothly remove the severed neck from engagement with the chains as the point of disposal is reached so that the neck is prevented from being retained on the chains and becoming lodged between the latter and the extension means supporting the chains.

It is, therefore, the most important object of this invention to provide apparatus for severing the neck of a bird from its body by utilizing cutter means on a support at one end of the latter and conveying the severed neck to a point spaced from the end of the support so that the neck will not become lodged in the conveying means to thereby jam the system and reduce the efficiency thereof.

Another important object of this invention is the provision of extension means on an automatic neck cutter for poultry, which extension means comprises a pair of elongated, spaced beams secured to the neck cutter for directing the severed neck of a bird to a point of disposal spaced from the support.

Still another important object of this invention is the provision of extension means on a machine for automatically severing the neck from a bird for conveying the severed neck to a point of disposal, which extension means includes a pair of idler gears operably coupled to the conveying system of the neck cutter machine for conveying the severed neck to said point of disposal and away from the machine itself.

Other important objects of this invention include the provision of guide means mounted on the extension means for smoothly moving the severed neck out of engagement with the chains conveying the neck to the point of disposal; the provision of guide means utilizing a substantially L-shaped member projecting into the path of the oncoming severed neck for engagement therewith and thereby moving the neck out of engagement with the chains; and the provision of guide means at the point of disposal on the extension means, which guide means is provided with a pair of longitudinal stretches substantially parallel to the path of travel of the severed neck so that the latter passes between said stretches and out of engagement with the chains for separation from the latter.

In the drawings:

FIG. 3 is an enlarged, fragmentary view of the machine shown in FIG. 1 with the main upper cover plates broken away to reveal details of construction of the components within the main housing of the machine;

FIG. 4 is an enlarged, fragmentary, plan view of the gear box forming a part of the poultry neck-severing machine and utilized to operably connect the prime mover with the next advancing vertebrae-separating and neck-severing components of the apparatus, certain portions of the gear box and gears thereof being broken away to reveal details of the elements thereunder.

Figure 1:
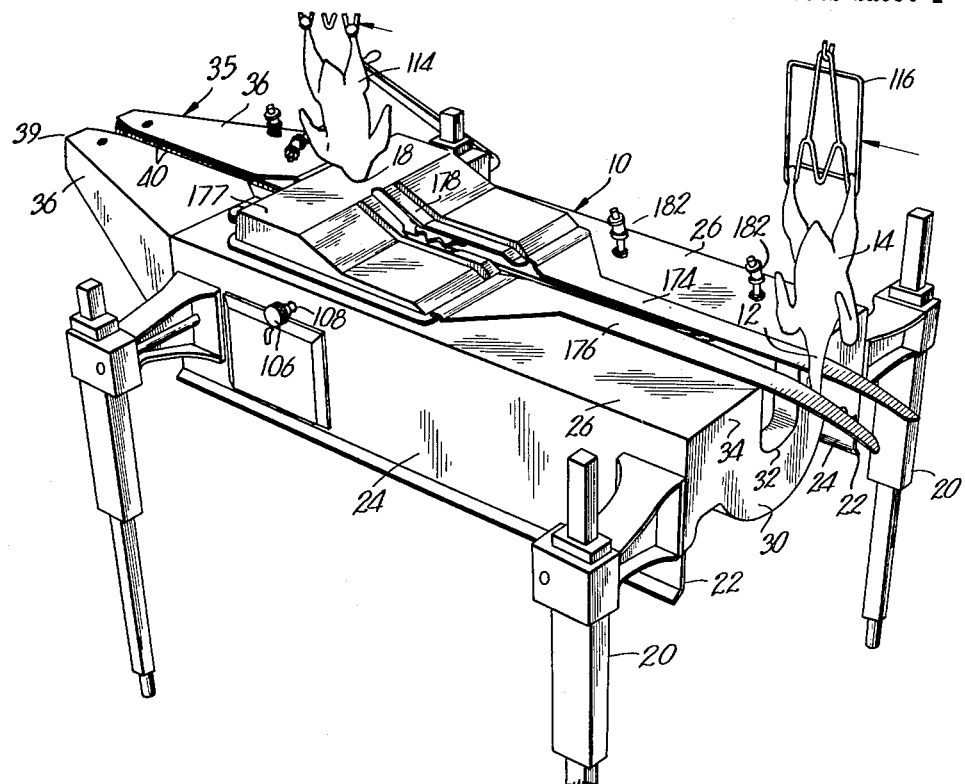
FIGURE 1 is a perspective view of a neck severing machine for poultry products and illustrating the way in which the same is adapted to be disposed to receive the neck of a bird as the same is advanced along a conventional overhead conveyor line and further illustrating the means for conveying the severed neck to a point of disposal remote from the cutter means on the machine.

FIGS. 5 and 6 are enlarged, fragmentary, vertical, cross-sectional views taken along lines 5—5 and 6—6 respectively, of FIG. 3; and FIG. 7 is a perspective view of the guide means mounted on the extension means proximal to the point of release of the severed neck from the chains.

A poultry neck-severing machine is illustrated in the drawings and designated by the numeral 10, machine 10 being particularly adapted for automatically removing the neck 12 from birds 14 while the same depend by their legs from a shackle 16 in turn carried by a continuously moving overhead conveyor (not shown). Poultry neck-severing machine 10 is constructed so as to sever the neck 12 of bird 14 substantially at the zone 18 of bird 14 defined by the area of merger of neck 12 with the uppermost part of the bird's body, and which is substantially at the point at which the vertebrae in the bird's neck join its spine.

Frame 20 of machine 10 supports a pair of substantially L-shaped bed plates 22, with the vertical wall portions 24 of each bed plate 22 resting on frame 20 while upper horizontal cover portions 26 lie in a common plane and are disposed with their proximal, longitudinally extending edges 28 in spaced relationship. Vertical end walls 30 and 31, connected to opposed ends of bed plates 22 and interconnecting the same transversely thereof, each have elongated, vertical, centrally disposed notches 32 extending downwardly from the upper margins 34 of respective end walls 30 and 31. Notches 32 and end walls 30 and 31 are aligned longitudinally of machine 10 for clearing the neck 12 of birds 14 as the same are advanced through machine 10.

Extension means 35 is mounted on end wall 31 and extends laterally therefrom as is clear in FIG. 3, and includes a pair of spaced, L-shaped hoods 36 secured at ends 37 thereof to end wall 31 by means of fasteners 38. The opposite ends 39 of hoods 36 converge and, as shown in FIG. 3, the inner longitudinal edges 40 of hoods 36 are spaced so as to permit the passage of a conveying means to be described therebetween.

Conveyor mechanism broadly designated 41 and housed within bed plates 22 and end walls 30, includes a pair of sprocket wheels 42 rotatably carried by suitable brackets (not shown) beneath the cover portion 26 of one of the bed plates 22, and disposed in longitudinally-spaced relationship, while a second pair of identical sprocket wheels 43, are likewise rotatably mounted by suitable bracket components beneath the cover portion 26 of the opposite bed plate 22, corresponding sprocket wheels 42 and 43 being located in opposed, transverse alignment beneath the cover portions 26 on extension means 35 and, also, proximal to end wall 30 as is clear in FIG. 3.

The axes of sprocket wheels 42 and 43 are also aligned longitudinally of bed plates 22 and parallel with the major length of respective edges 28. A pair of endless chains 44 and 45 of equal length are trained about respective pairs of sprocket wheels 42 and 43 with each chain 44 and 45 being of sufficient length that the same is relatively loose when initially placed around corresponding sprocket wheels 42 and 43. Vertical shafts 46 and 48 located on opposite sides of edges 28 of bed plates 22, and disposed between respective sprocket wheels 42 and 43, each have a sprocket wheel 50 keyed thereto and disposed to engage chain 44 or 45 respectively. Shafts 46 and 48 are located in predetermined positions relative to edges 28 of bed plates 22 and also with respect to end wall 31 for reasons to be hereinafter defined.

Means for maintaining each of the endless chains 44 and 45 in a substantially taut condition, comprises a pair of idler asemblies 52 identical in character and mounted beneath cover portions 26 of each of the bed plates 22 in transversely extending relationship thereto. Each idler assembly 52 includes an elongated member 54 having a pair of longitudinally extending, spaced slots 56 adapted to receive respective screws 58 threaded into corresponding cover portions 26, as clearly indicated in FIG. 5. A substantially L-shaped bracket 60 having a vertical leg 62 secured to the lower face of member 54 intermediate the ends thereof, receives one end of an adjusting screw 64, with washer 66 secured to screw 64 limiting movement of the latter in one direction toward leg 62 of bracket 60, while removable cotter pin 68 restricts shifting movement of externally threaded screw 64 in the opposite direction. Idler sprocket wheel 70, rotatably mounted between elongated leg 62 of bracket 60 and member 54 by a shaft 72 extending therebetween, is adapted to engage a respective chain 44 and 45 in order to maintain the same in a taut condition. Lock nuts 74 movably threaded on screw 64 on opposed sides of a corresponding vertical wall 24, permit selective adjustment of a respective idler sprocket wheel 70 with respect to each of the chains 44 and 45. Screws 58 may be readily loosened to permit the adjustment referred to above.

With idler sprocket wheels 70 in relatively firm engagement with chains 44 and 45, elongater stretches 76 of chains 44 and 45 are disposed in proximal, substantially parallel relationship and it is to be noted at this point that sprocket wheels 42 and 43 are so disposed as to cause stretches 76 of each of the chains 44 and 45 to be spaced a distance somewhat less than the normal diameter of the neck 12 of a bird 14. In this manner, when the neck 12 of a bird 14 is received between stretches 76 of chains 44 and 45, such neck is advanced during rotation of sprocket wheels 50 and thereby movement of chains 44 and 45, as hereinafter more fully explained.

Elongated guides 78 and 80 are mounted beneath cover portions 26 of bed plates 22 adjacent edges 28 thereof. Each of the guides 78 and 80 is transversely L-shaped and has a longitudinally extending leg 82 flush with cover portions 26, as well as a longitudinally extending leg 84 depending therefrom and engaging a respective stretch 76 of chains 44 and 45. Outwardly turned extensions 86 integral with legs 84 of guides 78 and 80 and located adjacent end wall 30, serve to assure movement of necks 12 of birds 14 into the space between stretches 76 of chains 44 and 45.

A pair of elongated beams 87 are secured to respective hoods 36 and disposed on either side of chains 44 and 45 so as to provide guide means for the chains as the same move over sprocket wheels 42 and 43 located on end 39 of extension means 35. Beams 87 are transversely L-shaped and are secured to the top portions of hoods 36 by fastener means 89. The ends of beams 87, spaced inwardly from end wall 31, are disposed proximal to the corresponding ends of guides 78 and 80 so as to form a substantially unbroken channel for guiding chains 44 and 45 to end 39 of extension means 35, and are laterally adjustable on fastensrs 89 so as to vary the spacing therebetween.

The ends of guides 78 and 80, having extensions 86 thereon, are pivotally secured to respective cover portions 24 of bed plates 22 by pins 88, while adjustable mechanism broadly numerated 90, is secured to opposite ends of each of the guides 78 and 80 for pivoting corresponding ends of guides 78 and 80 about pivot pins 88. Each of the adjustment mechanisms 90 is substantially identical in construction and comprises a block 92 secured to the underface of a corresponding cover portion 26 and having a longitudinally extending, horizontal, internally threaded passage 94 complementally receiving an elongated, externally threaded adjustment screw 96. L-shaped brackets 98 mounted in positions with the legs 100 thereof secured to a respective leg 84 of corresponding guides 78 and 80 and a leg 102 joined to respective legs 82 of guides 78 and 80, are located in positions whereby legs 102 of brackets 98 may receive the innermost ends of screws 96. Releasable lock collars 104 secured to screws 96 on opposed sides of respective legs 102, prevent movement of screws 96 relative to brackets 98. Knurled knobs 106, secured to the outermost ends of screws 96 projecting through openings 108 in corresponding vertical side wall portions 24, facilitate rotation of screws 96 to swing the ends of guides 78 and 80 adjacent wall 31 about pivot pins 88. Transversely extending slots 110 in each of the guides 78 and 80, adjacent adjustment mechanisms 90 and slidably receiving depending pins 112 carried by cover portions 26, restrict swinging of guides 78 and 80 toward and away from stretches 76 of chains 44 and 45.

Power means for rotating shafts 46 and 48 and thereby sprocket wheels 50 operably coupled with chains 44 and 45, includes an electric motor 114 adjustably mounted on wall 24 of one of the bed plates 22. As shown in FIG. 3, a pair of parallel, elongated, L-shaped brackets 116 and 118 are secured to the base of motor 114 and are horizontally reciprocable on a pair of parallel, spaced rods 120, in turn mounted on a pair of upright, L-shaped brackets 122 and 124 secured to the defined side wall 24 of machine 10. An externally threaded screw 126 passing through brackets 122 and 116 in parallelism with rods 120 permits horizontal adjustment of motor 114 in response to turning of hand wheel 128 secured to the outer end of screw 126.

Pulley 130 on the shaft of motor 114 is operably coupled with the pulley 132 mounted on shaft 134 of a gear unit broadly numerated 136. Opposed, cup-shaped housings 138 have releasably interconnected, complemental flanges 140 which prevent leakage of oil contained within gear unit 136 with shafts 46 and 48 constituting a part of gear unit 136 and extending upwardly therefrom above cover portions 26 of bed plates 22 to receive respective vertebrae separating discs 142 and 144, to be described in greater detail hereinafter. A relatively small spur gear 146 keyed to shaft 134 intermeshes with a substantially larger spur gear 148, in turn keyed to a shaft 150 parallel with shaft 134. Another small spur gear 152 keyed to shaft 150 above spur gear 148 intermeshes with a relatively larger spur gear 154 freely rotatable on shaft 134 but having a small spur gear 156 disposed thereabove in surrounding relationship to shaft 134 and rigidly connected to gear 154 for rotation therewith. Large spur gear 158 keyed to shaft 160 parallel with shafts 134 and 150 operably intermeshes with spur gear 156, as well as a relatively small spur gear 162 interposed between spur gear 158 and another large gear 164 keyed to shaft 46. A spur gear 166 of a diameter equal to gear 164 intermeshes with the latter and is keyed to shaft 48. It is, therefore, apparent that shaft 134, which also extends upwardly from the uppermost housing 138 of gear unit 136, is rotated at a substantially higher rate than shafts 46 and 48 during operation of motor 114.

Figure 2:
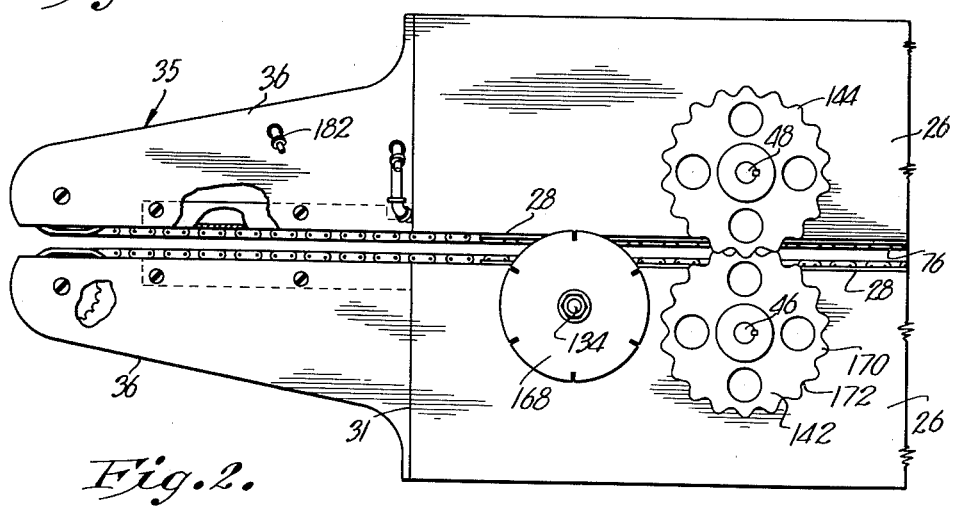
FIG. 2 is an enlarged, fragmentary, plan view of the vertebrae separating and neck severing components of the machine, with the cover plate normally overlying the same, removed to expose the parts thereunder.

Shafts 134, 46 and 48 extend upwardly through cover portions 26 of respective bed plates 22 with shaft 134 being located to one side of stretches 76 of chains 44 and 45, as shown in FIG. 2. A disc-like cutter 168 is secured to the upper end of shaft 134 above cover portions 26 and clears the outer peripheral margins of discs 142 and 144.

Each of the discs 142 and 144 has an undulating peripheral margin formed of a series of circumferentially spaced, outwardly extending projections 170 provided with smooth convex edges, integral with respective discs 142 and 144 and interconnected by concave edges 172 presenting notches between projections 170 and merging smoothly with the latter.

Discs 142 and 144 are of predetermined diameter so as to cause projections 170 to overlap during rotation of discs 142 and 144, while edges 172 on opposed discs are in spaced relationship to receive the skin, flesh and muscles of the bird's neck during advancement of the same by stretches 76 of conveyors 44 and 45.

A pair of guide plates 174 and 176 disposed on opposed sides of stretches 76 of chains 44 and 45 above cover portions 26 are adapted for assuring movement of the neck 12 of bird 14 into the space between stretches 76 as the bird is advanced forwardly by the overhead conveyor mechanism referred to above. A protective cover panel 177 overlying discs 142 and 144 and cutter 168 prevents the operator from being injured by the rotating mechanism, while an elongated slot 178 in cover panel 177 and aligned with stretches 76 clears the neck 12 of bird 14 until the neck is severed by cutter blade 168.

Guide means 180 is associated with each of wheels 42 and 43 proximal to end 39 of extension means 35, and comprises a plate 182 secured to a block 184 so as to form a substantially L-shaped bracket 186 which is secured to the underside of the corresponding hood 36, as is clear in FIG. 3. Each bracket 186 is provided with a pair of L-shaped members 188, each having a first stretch 190 secured to block 184 and a a second stretch 192 extending outwardly in the path formed by chains 44 and 45 and extending substantially parallel therewith. Members 188 of each bracket 186 are vertically spaced so that the corresponding chain passes therebetween, and it is clear that the severed neck conveyed by chains 44 and 45 will become separated from the latter when the neck engages members 188 on each side of the path of travel thereof, so that the neck is moved out of substantial engagement with the chains to thereby prevent the lodging of the neck between the chains and the side walls of hoods 36.

In operation, motor 114 is operated to rotate pulley 132 which in turn causes gear 146, keyed to shaft 134, to turn gear 148, thereby effecting rotation of shaft 150 and spur gear 152 connected thereto. Gear 154 is rotated responsive to movement of gear 152 and turns spur gear 156 therewith which causes gears 164 and 166 and thereby, shafts 46 and 48 to be rotated through gears 158 and 162. Shaft 134, having cutter blade 168 connected thereto, is rotated at a substantially higher speed than shafts 46 and 48, while discs 142 and 144 are rotated at a speed correlated with advancement of chains 44 and 45 by virtue of the fact that sprocket wheels 50 are mounted on shafts 46 and 48 in conjunction with discs 142 and 144 and are of substantially equal diameter.

As the birds are advanced by the overhead conveyor mechanism in a position depending from shackles 16, the necks 12 thereof are directed into the space between stretches 76 of chains 44 and 45 by guide plates 174 and 176 and also extensions 86 on guides 78 and 80. It is to be understood that the chains 44 and 45 are driven at a speed substantially equal to that of the overhead conveyor mechanism so that bird 14 is maintained in an upright position as the same is moved toward discs 142 and 144. When the neck 12 of bird 14 reaches discs 142 and 144, the proximal projections 170 are forced into the bird's neck between a pair of vertebrae substantially at the zone of merger of the fowl's neck with its spine. Although discs 142 and 144 are not positioned so that the same are in interengagement, such discs are in relatively close proximity so that projections 170 permanently separate a pair of vertebrae while the skin, flesh and muscles of the bird's neck are received in the space between opposed edges 172 presenting notches between projections 170. Discs 142 and 144 operate to separate the bird's vertebrae at the desired point without injuring the external surface of such neck, which would mar the appearance of the final dressed product, and furthermore, separation of a pair of vertebrae is effected in close proximity to the main body of the bird 14.

As the neck 12 of bird 14 is continuously moved forward by chains 44 and 45, such neck is severed between the permanently separated vertebrae by cutter disc 168 which lies substantially in a horizontal plane through the space between overlapping portions of discs 142 and 144. Thus, a clean cut is obtained inasmuch as it is not necessary for the blade to sever bone during the cutting operation and the neck presents a neat appearance, since blade 168 does not become dulled rapidly which would otherwise be the case if it was necessary that such blade also cut through the bone of the bird's neck.

It should also be pointed out that water spray mechanism may be provided on machine 10 for spraying water from nozzles 182 onto bird 14 and the neck 12 thereof during the vertebrae-separating and neck-severing procedure related above.

Machine 10 is also advantageous since full adjustment of the various components is provided to compensate for birds having necks of different sizes and also assuring proper forward movement of the neck 12 of bird 14 in conjunction with forward advancement of the same by the overhead conveyor system.

The speed at which the neck removal process may be carried out is greatly increased through utilization of machine 10 because of the fact that it is necessary for cutter 168 to only sever an area of the bird's neck devoid of bone and therefore, the cutting is rendered much easier and faster and birds may be passed through the machine at a relatively high rate of speed.

The severed necks are received by suitable disposal means placed below end 39 of extension means 35, and it is evident that it is impossible for the necks to remain on chains 44 and 45 as the same engage wheels 42 and 43 at end 39, by virtue of engaging members 188. Furthermore, the necks are released from chains 44 and 45 at a sufficient distance from end wall 31, so that the same may not become lodged between the chains and any part of the supporting structure.

Having thus described the invention what is claimed as new and desired to be secured by Letters Patent is:

1. In poultry processing equipment for severing the neck of a bird from the body thereof as the same is advanced along a predetermined path of travel and provided with an elongated support disposed adjacent said path, a cutter on said support proximal to one end of the latter, and a pair of endless chains carried by the support for engaging the neck to be severed therebetween and conveying the same to the cutter, the improvement of which comprises structure for conveying the severed neck of the bird away from said cutter to a point of release spaced a relatively large distance from said one end of the support in the direction of movement of the bird to prevent the neck from being released at said one end and thereby jamming said chains, said structure including extension means on the support at said one end thereof projecting outwardly therefrom to said point and means carried by said extension means proximal to said point and operably coupled with said chains to extend the latter to said point.

2. In poultry processing equipment as set forth in claim 1, wherein said extension means comprises a pair of elongated, spaced beams secured to said support at said one end of the latter and disposed on opposed sides of said path.

3. In poultry processing equipment as set forth in claim 1, wherein said means carried by said extension means includes a pair of sprocket wheels each operably coupled with a corresponding chain and rotatable about and axis substantially normal to said path.

4. In poultry processing equipment as set forth in claim 3, wherein said wheels are disposed on opposite sides of said path, and including guide means on said extension means adjacent each wheel for directing the corresponding chain onto the latter.

5. In poultry processing equipment for severing the neck of a bird from the body thereof as the same is advanced along a predetermined path of travel and provided with a support disposed adjacent to said path, a cutter on said support proximal to one end of the latter, and a pair of endless chains carried by the support for engaging therebetween the neck to be severed and conveying the same to the cutter, the improvement of which comprises extension means carried by said support for extending said path from said one end of the support to a point of release spaced from said one end and including a pair of spaced beams extending outwardly from said one end on each side of said path, means on said extension means for extending said chains to said point including a pair of sprocket wheels on opposed sides of said path proximal to said point and adapted to be operably coupled to said chains, and guide means associated with each wheel for directing the corresponding chain onto the latter, said guide means including a bracket secured to said extension means proximal to said support and a pair of spaced, L-shaped members secured to said bracket and extending into said path, each of said members having a stretch substantially parallel with said path, said stretches associated with each bracket being vertically spaced to permit the corresponding chain to pass therebetween.

6. In poultry processing equipment for severing the neck of a bird from the body thereof as the same is advanced along a predetermined path of travel and provided with an elongated support disposed adjacent said path, a cutter on said support proximal to one end of the latter, and a pair of endless chains carried by the support for engaging the neck to be severed therebetween and conveying the same to the cutter, the improvement of which comprises structure for conveying the severed neck of the bird to a point of release spaced from said one end of the support to prevent the neck from being released at said one end and thereby jamming said chains, said structure including extension means on the support at said one end thereof projecting outwardly therefrom to said point, a pair of sprocket wheels rotatably mounted on the extension means on opposed sides of said path, said sprocket wheels being disposed proximal to said point and coupled with the chains to extend the latter to said point, said sprocket wheels being rotatable about axes substantially normal to said path, and guide means on said extension means adjacent each wheel for directing the corresponding chain onto the latter, said guide means including a bracket secured to said extension means and a pair of spaced projections on the bracket extending into the path of travel, the corresponding chain adapted to pass between corresponding projections.

References Cited in the file of this patent

UNITED STATES PATENTS

| | | |
|---|---|---|
| 2,793,393 | Fosdick | May 28, 1957 |
| 2,926,383 | Steck | Mar. 1, 1960 |